Sept. 7, 1937. A. DE VRIES 2,092,341
MEANS FOR SECURING ARTICLES TO WALLS AND THE LIKE
Filed June 27, 1936
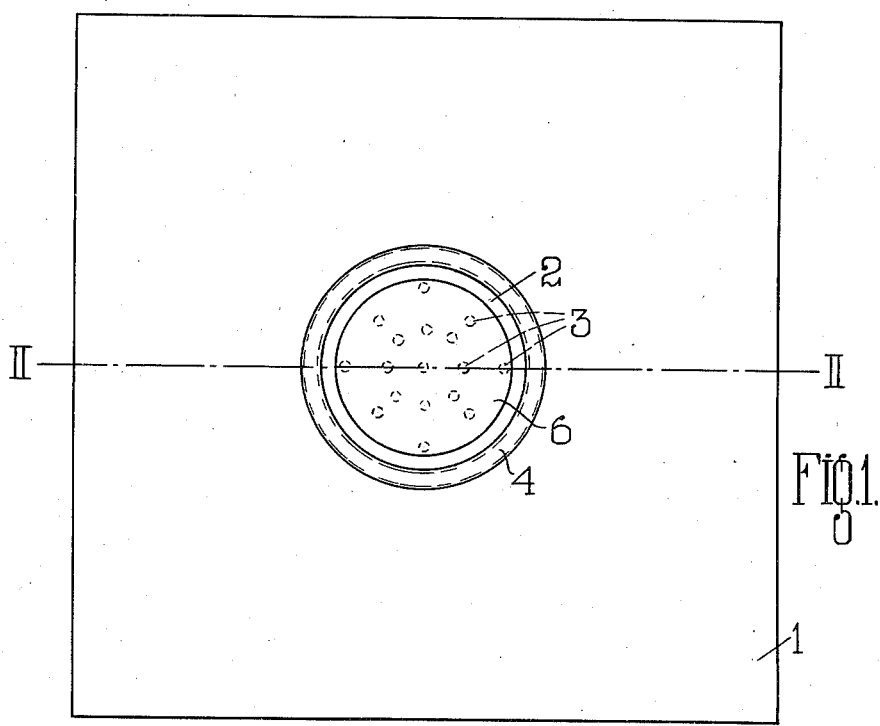
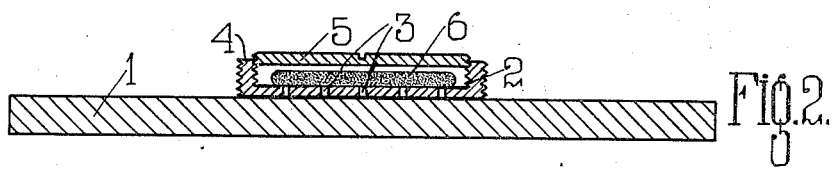
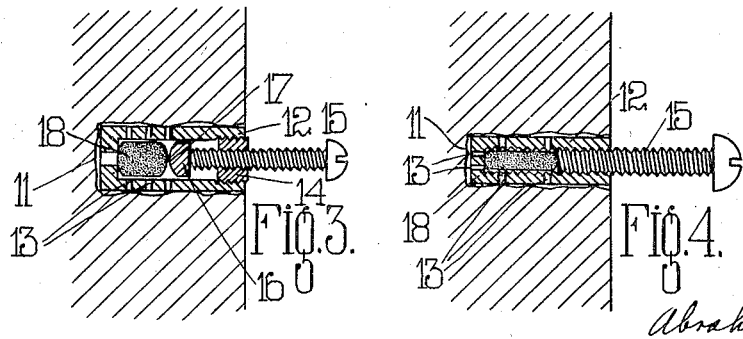
Inventor:
Abraham de Vries
By: Mason Porter
Attorneys Patented Sept. 7, 1937

2,092,341

UNITED STATES PATENT OFFICE 2,092,341

MEANS FOR SECURING ARTICLES TO WALLS AND THE LIKE

Abraham de Vries, Amsterdam, Netherlands

Application June 27, 1936, Serial No. 87,771
In Great Britain September 13, 1935

9 Claims. (Cl. 72—105)

The present invention relates to devices for fastening articles to supports such as walls, by means of an adhesive.

The object of the present invention is to simplify the method of fixing where an adhesive is concerned over the known methods of applying an adhesive to a support such as, for example, by means of a brush where an insufficiently thick layer may be applied for satisfactory working, or the adhesive may harden before the article can be pressed on to the support.

By the present invention a device for fastening articles to a support comprises a hollow member open at one end to provide a hollow space and with at least one wall perforated, a supply of adhesive within said hollow member, a displaceable wall for closing the hollow space within said member and for extruding said adhesive through said perforations on to a surface of a support and means such as a screw thread externally of one wall of said hollow member for the detachable connection of an article to said hollow member.

In using the device the surface provided with openings is placed in engagement with the wall and then by pressing in the displaceable wall the volume of the hollow space is reduced so that the adhesive is pressed out through the openings and is spread between the surface of the wall or of the hole and sticking-surface of the device.

Where heavy articles are to be fixed on to a wall it is preferable to make use of a hook or bolt fixed in the wall, and for this purpose there is provided a hollow plug for insertion in a hole in the wall, the walls of which plug are provided with holes and at the inner surface are provided with a screw-thread, the mouth of which plug is closed by a bolt in such a way that the hollow space within the plug can be reduced in size by screwing in the bolt. The adhesive in the plug is thus pressed outward through the holes between the wall of the hole and the outer wall of the plug.

In connection with these devices there is considerable advantage in using closed capsules, which are filled with adhesive, and which can be readily opened by exerting pressure on them. The capsules are inserted in the said hollow space the size of which is reduced by screwing in the closure member so that the capsule is pierced and the adhesive is pressed out through the holes.

Specific embodiments of the present invention will now be described, by way of example, with reference to the accompanying drawing, of which:—

Figure 1 is an elevation of the device, according to the present invention, secured to a wall-tile.

Figure 2 is a section on the line II—II of Figure 1.

Figure 3 is a longitudinal section of a plug arranged in a hole in a wall.

Figure 4 is a longitudinal section of a plug of more simple construction arranged in a hole in a wall.

As shown in Figures 1 and 2, a wall-tile 1 has secured thereto a copper plate 2 which is provided with holes 3. Formed integrally with the plate 2 there is a flange 4 which is provided on its outer and inner surfaces with a screw-thread. A closure member 5 is screwed on to the inner surface of the flange 4. A disc-shaped capsule 6, filled with adhesive, is inserted into the space enclosed by the plate 2, the flange 4 and the closure member 5. By further screwing in the covering plate 5 the capsule 6 is compressed so that its thin envelope bursts and the adhesive is pressed through the holes 3 to between the plate 2 and the tile. After the adhesive has dried, the article which it is required to secure to the wall is screw-threaded on to the outer surface of the flange 4.

The breakage of the envelope of the capsule may be facilitated, e. g., by providing the holes 3 with a sharp inwardly projecting edge.

As shown in Figure 3, the hole 11 is made in a wall. A copper plug 12, provided with holes 13, is inserted in the hole 11. The mouth of the plug 12 is closed by a member 14 screwed into the plug 12, and a bolt 15 is screwed through the member 14. In the plug there is inserted an intermediate member 16 with a point 17, and also a capsule 18 containing adhesive. By screwing in the bolt 15 the intermediate member 16 is pressed against the capsule 18, so that the envelope is pierced by the point 17, and by continuing the inward movement of the bolt 15 all adhesive is pressed from the plug 12, through the holes 13, so that it percolates between the plug 12 and the wall of the hole 11.

After the adhesive is dry the plug is immovably fixed in the wall and a hook can be screwed into the plug in place of the bolt 15 or, if it is convenient, the bolt 15 can be used as a hook.

The fastening illustrated in Figure 4 is more simple. The plug 12 is provided with holes 13 and is screw-threaded to receive a bolt 15. A capsule 18, filled with adhesive, is inserted in the wall-plug 12, and the bolt 15 is partially screwed in so that the capsule is not pierced. The plug is then placed in the hole and the bolt 15 is screwed further in so that its point breaks the envelope of the capsule. The holes 13, at the inner end of the plug, are preferably provided with sharp inwardly directed edges.

It is evident that the use of a capsule, filled with adhesive, is not required. The required amount of adhesive could be injected into the hollow space from a supply tube.

It will be seen that in order to improve the distribution of the adhesive, the surface of the plate or plug could be provided with ducts interconnecting the holes in a manner similar to that which is well known in lubricating bearings.

I declare that what I claim is:—

1. A device for fastening articles to a support, comprising a hollow member adapted to be secured to the support and having a perforated wall conforming in shape to the surface of the support to which it is to be fastened, a capsule disposed within said hollow member and containing a supply of adhesive, said capsule being adapted to be broken and effective, when broken and pressure is applied thereto, to cause extrusion of the adhesive through said perforated wall onto the support, and means on said hollow member for detachably receiving an article to be supported.

2. A device for fastening articles to a support, comprising a hollow member adapted to be secured to the support and having a perforated wall conforming in shape to the surface of the support to which it is to be fastened, a capsule disposed within said hollow member and containing a supply of adhesive, and a member closing the open end of said hollow member and displaceable relative thereto for rupturing said capsule and extruding the adhesive through said perforated wall whereby to secure the hollow member to the support.

3. A device for fastening articles to a support, comprising a hollow member having a perforated base wall conforming in shape to the surface of the support to which it is to be fastened, and a flange portion extending away from the support and providing an accessible hollow space at the surface of the base wall remote from the support, a capsule containing a supply of adhesive and disposed within the hollow space, said capsule being effective when broken and when pressure is exerted thereon to cause the adhesive to be extruded through said perforated wall whereby to secure the hollow member to the support, and a member closing the open end of said hollow member and displaceable relative thereto for extruding the adhesive from the capsule through the perforated wall onto the surface of the support.

4. A device as claimed in claim 1 wherein sharp projections are provided on the inner face of one wall of said hollow member to rupture the said capsule upon the displacement of said displaceable wall.

5. A device for fastening articles to a support, comprising a hollow member having a perforated end wall adapted to be secured to the support and a peripheral wall extending away from the support, said peripheral wall being threaded internally, a capsule containing a supply of adhesive located within said hollow member, a closure disc threadedly engaging the internal threads on said peripheral wall and adapted, upon displacement thereof relative to said peripheral wall, to rupture said capsule and to extrude the adhesive through said perforated base wall onto the surface of the support, and threads on the external surface of said peripheral wall for receiving an article supporting device.

6. A device for fastening articles to a support having a recess therein, comprising a hollow member insertable within the recess in the support and having the side wall thereof perforated, said perforated wall having the inner surface thereof threaded, a capsule containing an adhesive located within said hollow member, and means threadedly engaging the threads on the inner surface of said perforated wall for rupturing said capsule and for causing the extrusion of adhesive through the perforated side wall onto the surface of the recess in the support.

7. A device for fastening articles to a support, comprising a hollow member adapted to be secured to the support, said member having a base wall and a peripheral wall extending outwardly from the said base wall, one of said walls being perforated and shaped to conform to the surface of the support to which the member is to be fastened, said hollow member being adapted to receive adhesive and to permit extrusion thereof through the said perforated wall onto the surface of the support, and means on said peripheral wall for detachably receiving an article to be supported.

8. A device for fastening articles to a support, comprising a hollow member having a perforated base wall conforming in shape to the surface of the support to which it is to be fastened and a peripheral flange portion extending away from the said base wall and providing an externally accessible hollow space to permit the reception and extrusion of an adhesive through said perforated base wall onto the support, and means on said flange portion for detachably receiving an article to be supported.

9. A device according to claim 8, wherein a supply of adhesive is disposed within the hollow member and is adapted to be extruded through the said perforated base wall onto the surface of the support for securing the said member thereto.

ABRAHAM de VRIES.